UNITED STATES PATENT OFFICE.

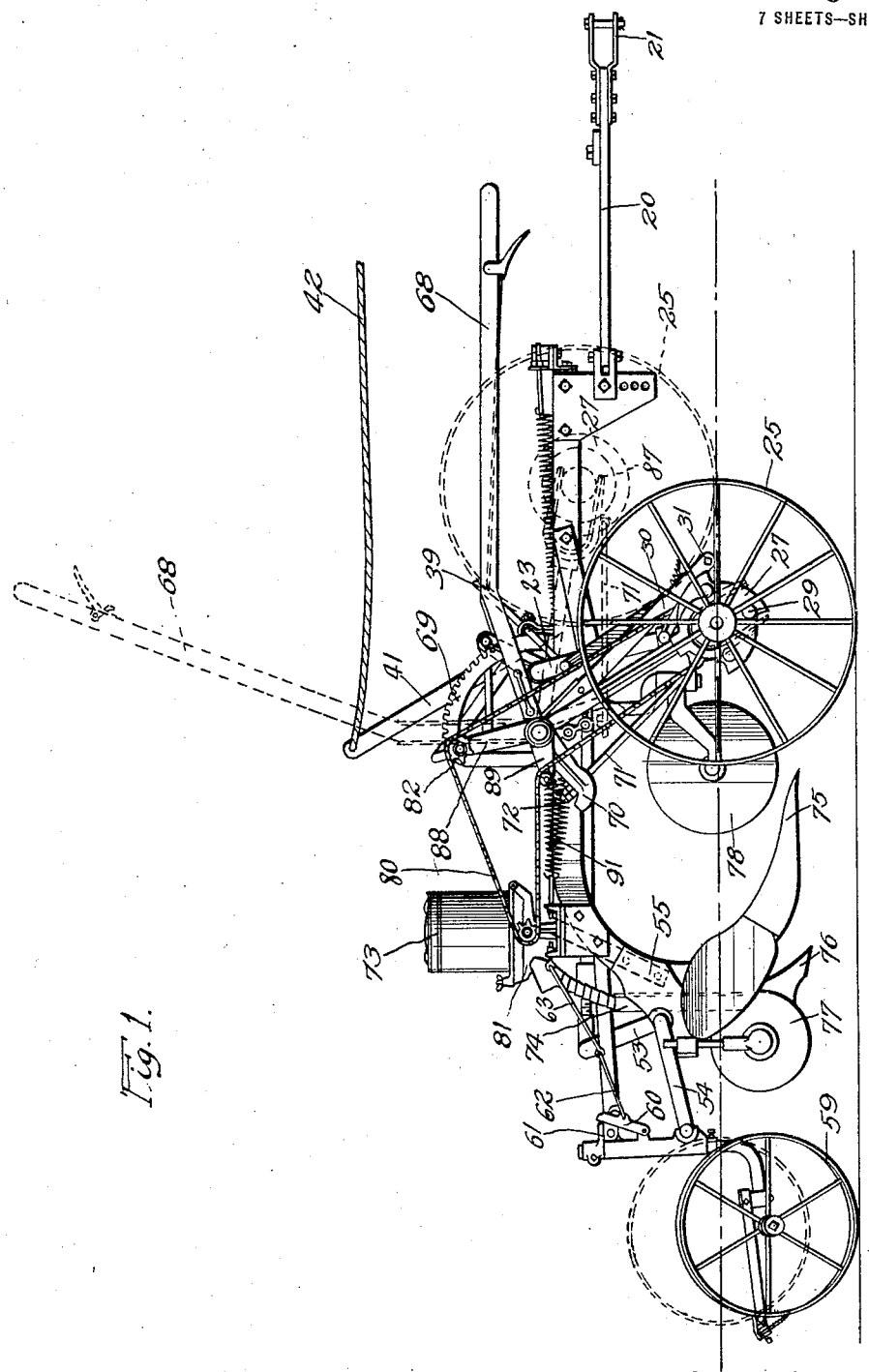

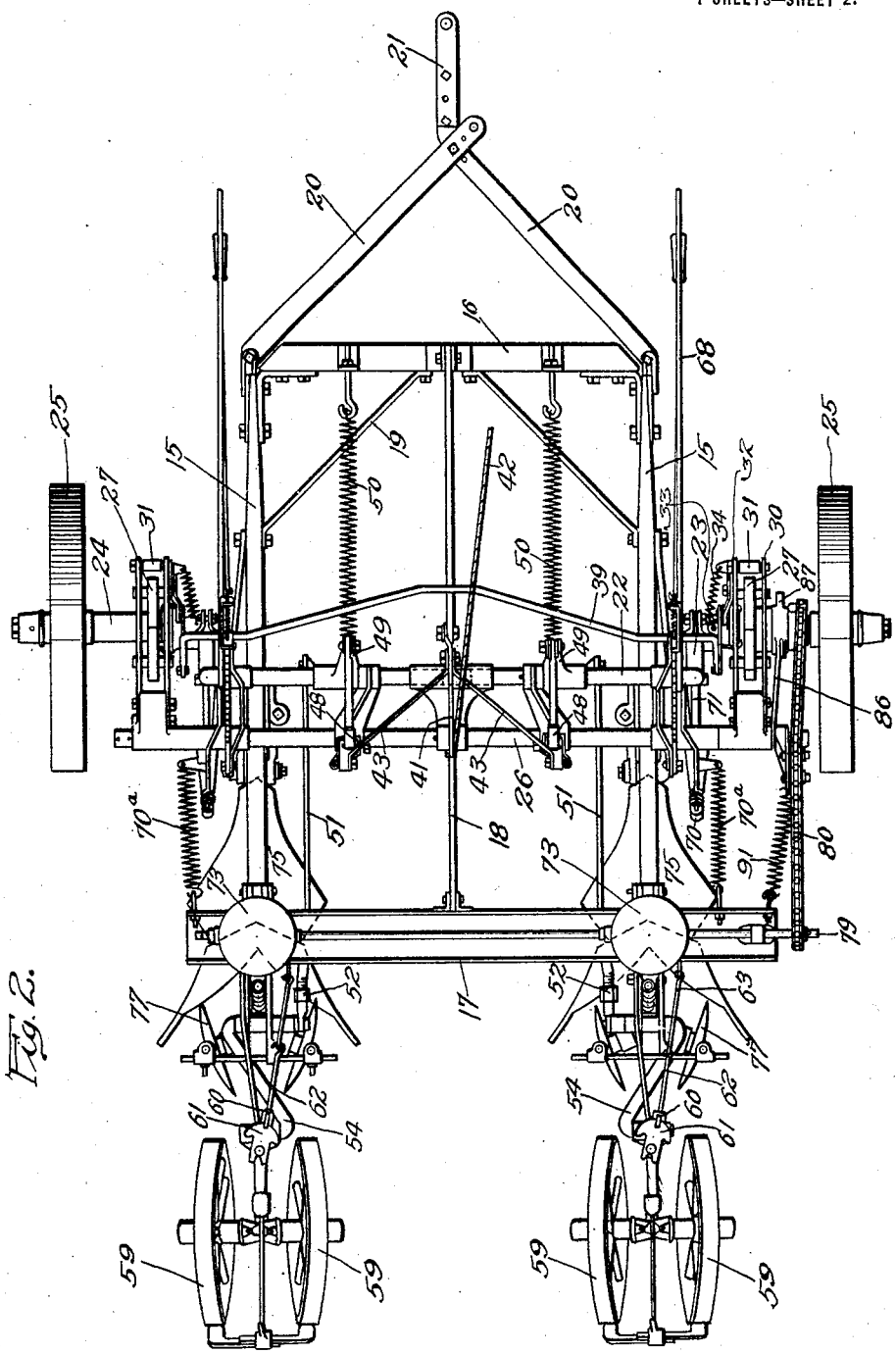

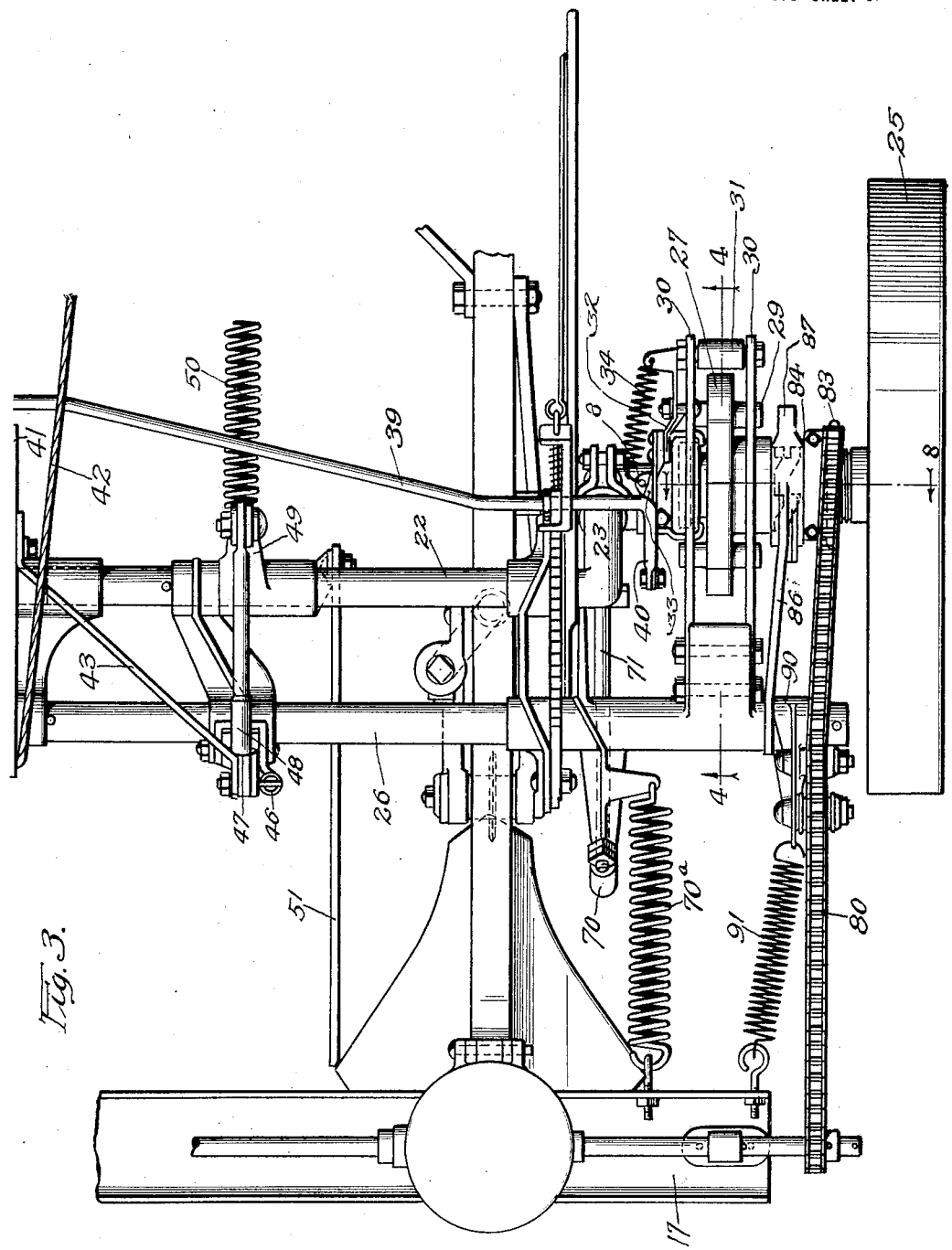

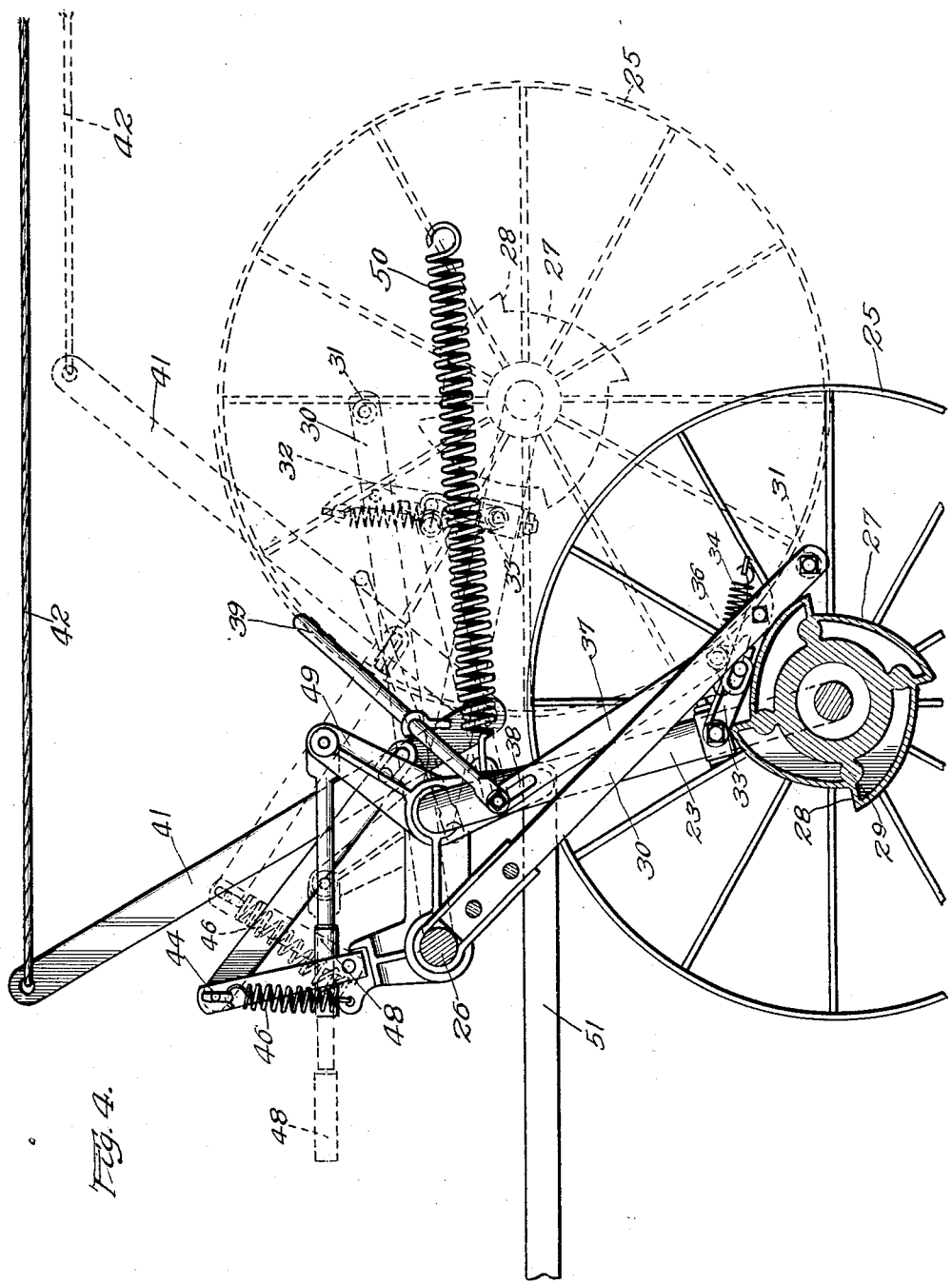

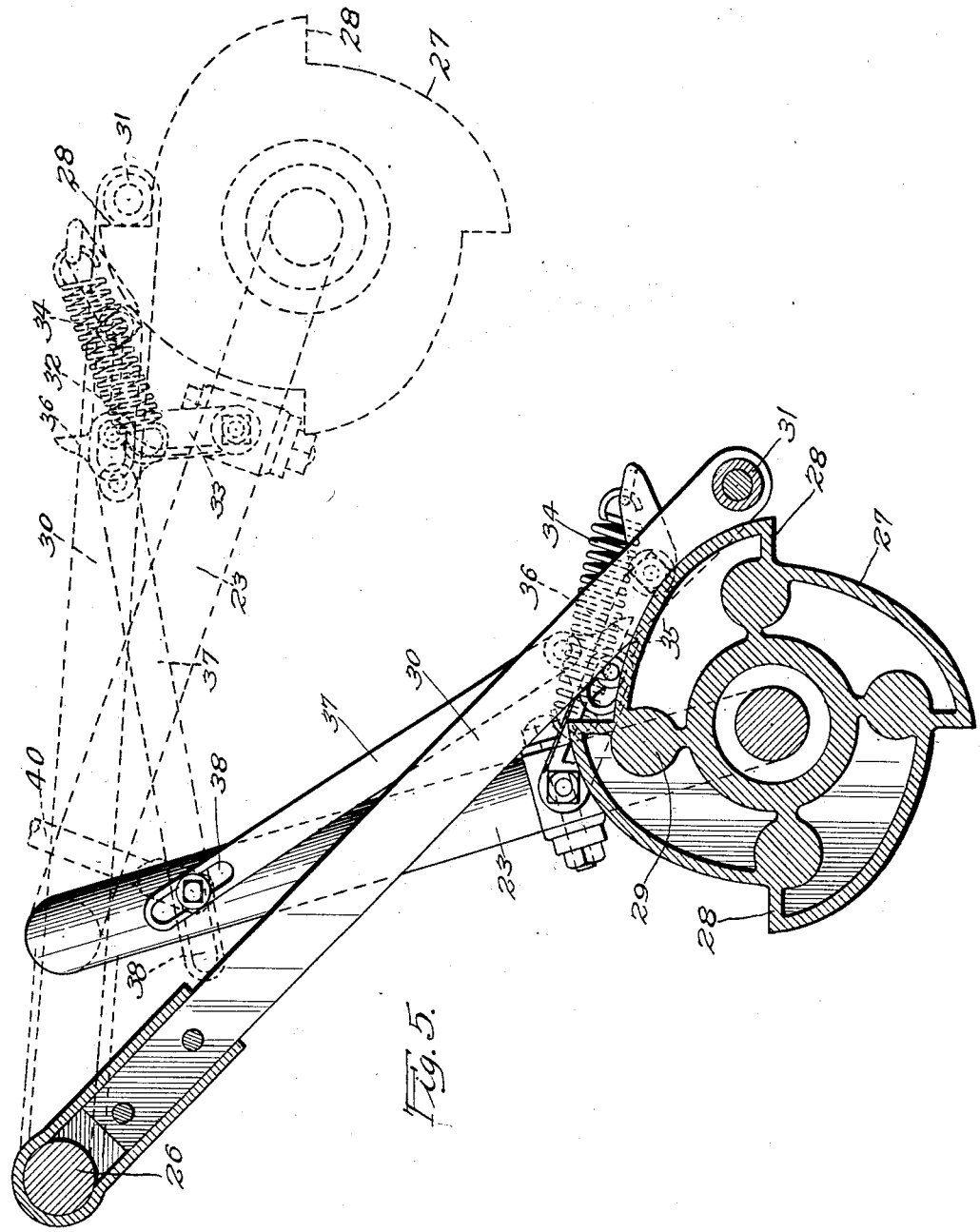

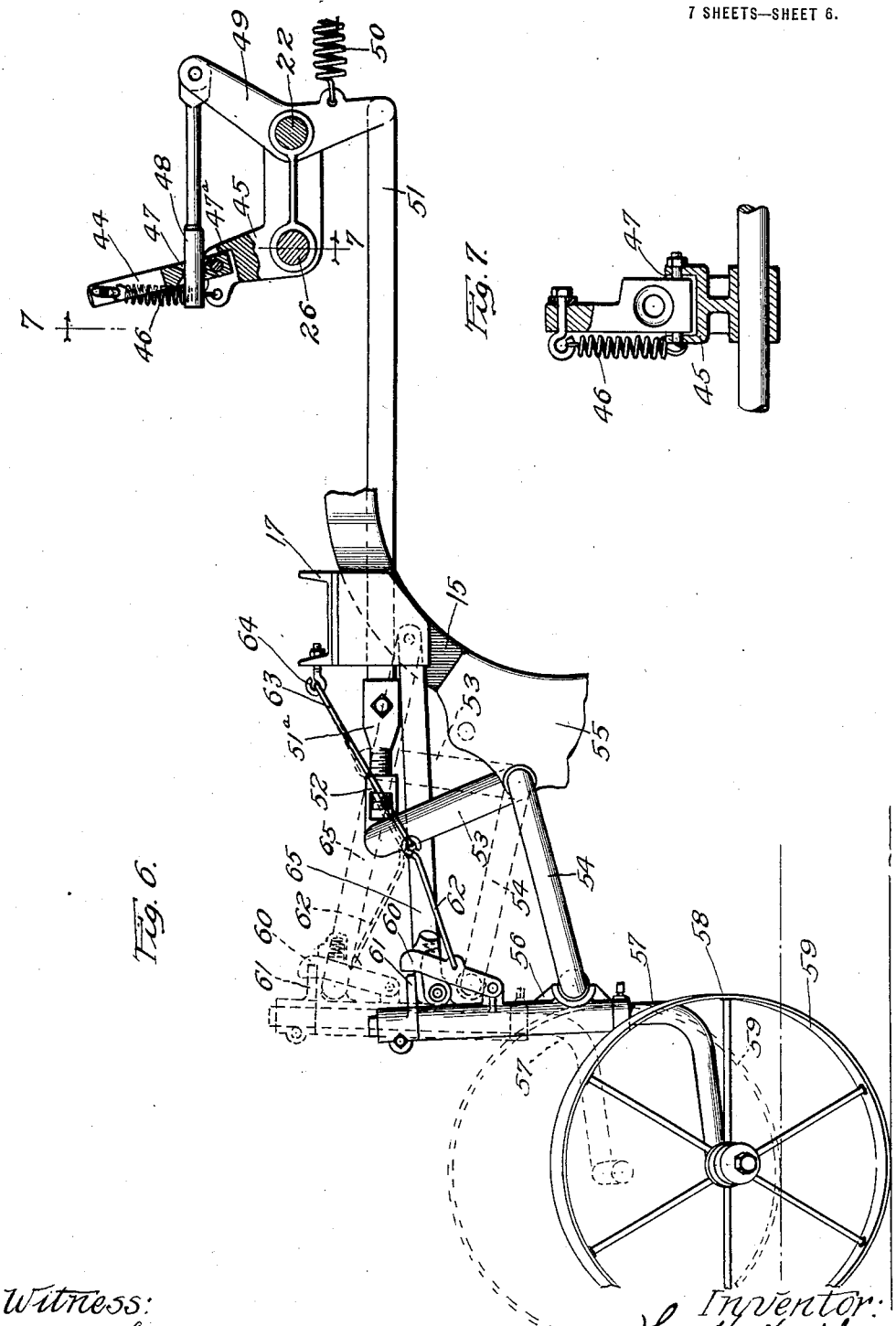

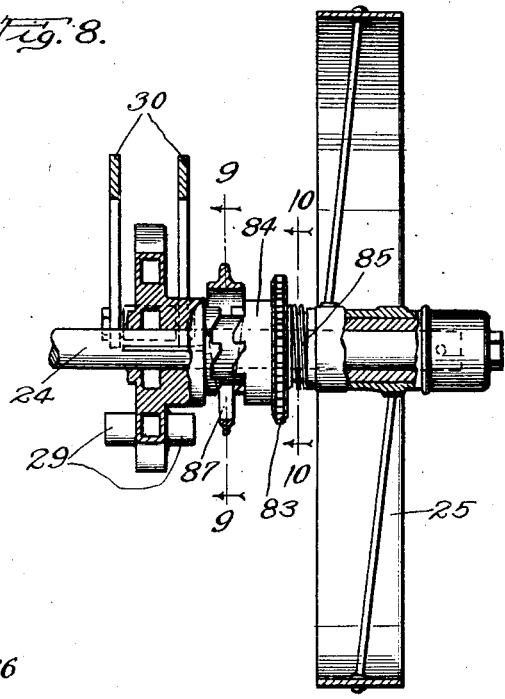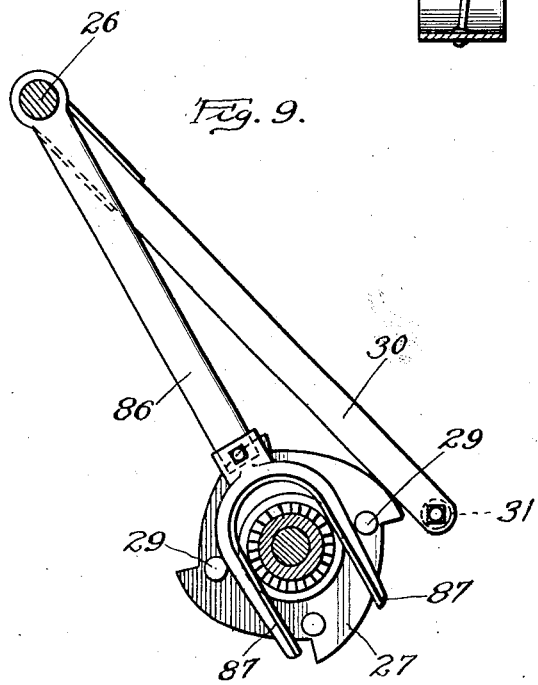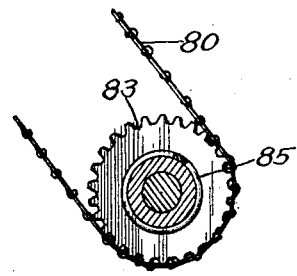

LEE H. KAUPKE, OF ROCK ISLAND, ILLINOIS, ASSIGNOR TO ROCK ISLAND PLOW COMPANY, OF ROCK ISLAND, ILLINOIS, A CORPORATION OF ILLINOIS.

POWER-LIFT LISTER.

1,387,406.    Specification of Letters Patent.    Patented Aug. 9, 1921.

Application filed July 7, 1919. Serial No. 309,054.

*To all whom it may concern:*

Be it known that I, LEE H. KAUPKE, a citizen of the United States of America, and resident of Rock Island, Rock Island county, Illinois, have invented a certain new and useful Improvement in Power-Lift Listers, of which the following is a specification.

My invention relates to an improvement in power-lift listers, and has for its object the provision of an improved implement of this character in which the power for raising the implement from the ground, including the furrow opening and covering devices, as well as the seeding devices, is derived from the ground wheels.

Further specific objects of my invention relate to the means for holding the lister in raised position, and to the means for raising the rear end of the implement simultaneously with the forward end. Other specific objects relate to the means for automatically disconnecting the seed shaft when the lister is raised out of the ground.

My invention is particularly adapted for use in connection with two-row implements, although certain features thereof are applicable to a single row machine, or to an implement in which the seeding apparatus is omitted.

These and other features and objects of my invention will be more readily understood by having reference to the accompanying drawings, in which I have illustrated one embodiment of my invention in connection with a two-row lister.

Figure 1 is a side elevation of a two-row power-lift lister, embodying the features of my invention, the parts being shown in full lines in the position they assume when the lister is raised out of the ground, and certain parts being shown in dotted lines indicating the position they assume when the lister has been lowered into seeding or planting position.

Fig. 2 is a plan view of the lister.

Fig. 3 is an enlarged plan view of a portion of the lister.

Fig. 4 is an enlarged detail of the clutch mechanism for raising the lister, the parts being shown in full lines in the position they assume when the lister is raised, and in dotted lines indicating the position they assume when the lister is lowered into the ground and the parts in planting position, the clutch members being shown disengaged.

Fig. 5 is a further enlarged detail view of the clutch mechanism, the full line position indicating the raised position, and the dotted line position indicating the lowered position, but showing the clutch members engaged.

Fig. 6 is an enlarged detail of the mechanism for raising the rear end of the machine, the full line position indicating the parts in the raised position of the lister, and the dotted line position indicating the position the parts assume when the lister has been lowered into the ground.

Fig. 7 is a sectional detail taken on the line 7—7 of Fig. 6.

Fig. 8 is an enlarged sectional view taken on the line 8—8 of Fig. 3.

Fig. 9 is a sectional view taken on the line 9—9 of Fig. 8.

Fig. 10 is a sectional view taken on the line 10—10 of Fig. 8.

There is illustrated in the drawings, a two-row machine having a pair of plow beams 15, secured together at their forward ends by a transverse frame bar 16, and at their rear ends by a transverse channel bar 17. A central longitudinal frame member 18 is likewise provided, this member extending from the front frame member 16 to the rear member 17. Diagonal braces 19 are likewise provided to provide increased strength. To the forward ends of the plow beams, there is secured a pair of converging draft arms 20, to which a suitable clevis 21 is connected through the medium of which the implement can be connected to a tractor or other suitable source of power. The plow beams are carried by a transverse axle 22, having downwardly and forwardly inclined end portions 23, from which extend lateral extensions 24, on which the supporting wheels 25 are mounted. Mounted to the rear of the axle 22, and extending transversely of the machine, there is a transverse shaft 26 for supporting various parts of the implement, as will be hereinafter described.

Being a two-row machine, the parts are duplicated on the two sides of the machine, and thus for purposes of description, I will describe the parts on one side of the machine, it being understood that this same arrangement is provided on the other side of the machine.

Mounted upon the lateral extension 24 of the axle, there is a clutch wheel 27 which is keyed to the wheel and constantly rotated thereby. This clutch wheel, as clearly shown in the enlarged detail in Figs. 4 and 5, is provided with a plurality of engaging faces 28 and a corresponding number of lateral lugs or projections 29 which extend outwardly from opposite sides of the face of the wheel, as clearly shown in Fig. 3. Pivotally mounted upon the cross shaft 26, are a pair of arms 30, which extend upon opposite sides of the clutch wheel 27 and carry the dog 31 which is adapted to engage with this clutch wheel when these arms are moved so as to bring this dog into engagement with one of the engaging faces 28 of the clutch wheel. Pivoted on one of the arms 30, there is a short link 32 which at its opposite end is pivoted to a second link 33 pivotally connected to the inclined portion 23 of the crank axle. The spring 34 is connected to an offset extension at one end of the link 32, the opposite end of this spring being connected to the link 33. This spring is so connected that when the links are in the position shown in full lines in Fig. 5, the spring operates on one side of the center line of the two links, thus operating to hold the links in this position, and thus holds the dog 31 out of engagement with the clutch; but when the links have been thrown into the position shown in dotted lines, the spring then operates on the other side of the center line and operates to hold the dog 31 in engagement with the clutch wheel. A lug 35 is provided on the link 32, which is adapted to be engaged by the lug 36 carried by the other link 33, in order to form a stop to prevent these links swinging further over center than is shown in the full lines of Fig. 5. Connected to the midpoint of these two links, there is a bar 37, the opposite end of which is provided with a slot 38. Extending transversely of the machine, there is a transverse operating rod 39 pivotally supported in suitable bearings near its ends and having downwardly extending end portions 40 which are pivotally connected in the slotted end of the bar 37. Pivotally mounted at the center of the machine on the longitudinal frame bar 18, there is an operating lever 41, to the upper end of which a rope 42 is secured, which rope extends forwardly and into a suitable position so that it can be grasped by the operator, who in usual practice will be riding upon the tractor, which is attached to the clevis 21 for drawing the implement. When this arm 41 is swung forwardly through the medium of the rope 42, it strikes the transverse rod 39, thus causing the same to pivot in its bearings and thus rotate the downwardly extending end portions 40 of this rod rearwardly. Connected to the operating lever 41, at a point intermediate its ends, there are a pair of rearwardly and laterally extending rods 43 extending to opposite sides of the implement, the opposite end of each of these rods being connected to the upper end of a corresponding friction link 44. These rods 43 are connected to the operating lever 41 by means of a slotted connection, thereby permitting these rods to have a limited independent movement. This friction link is pivotally mounted in a casting 45 carried by the cross shaft 26. A spring 46 is secured to the upper end of this friction link and secured at its lower end to the casting 45, the spring exerting a force tending to swing the link rearwardly. This friction link is provided with a circular opening 47, having its marginal portions cut away, as clearly shown in Fig. 6. Passing through this opening, there is a frictional rod 48, the opposite end of which is connected to a bell-crank arm 49, journaled on the axle 22 and keyed thereto. This construction is such that the spring 46 operates normally to swing the arm 44 about its pivot to the left, as shown in Fig. 6, and in this position the sides of the opening 47 grip the rod 48 and prevent this rod sliding in this opening. In this way, this construction operates as a lock to hold the lister in raised position, in a manner hereinafter more fully explained. When the friction link 44 is swung to the right, however, then the sides of the opening 47 in this link no longer grips the rod 48, but permit this rod to slide freely through the opening to a position in which the reduced portion of the rod 48 passes through the opening, the parts at this time being in the position they assume when the lister is in lowered or seeding position. When the reduced portion of this rod engages the opening, then even though the spring 46 is free to draw the friction link 44 to the left, still the sides of the opening 47 do not engage with this rod owing to the fact that the swinging movement of the link 44 is limited by reason of a stop 47ª formed on the casting 45.

Connected to the lower arm of the bell crank 49, there is a spring 50, the forward end of which is connected to the I-bolt carried by the front frame bar 16, this spring thus operating to yieldingly hold the plows in the ground during the operation of the machine. Likewise, connected to the lower end of the bell crank arm 49, there is a rearwardly extending rod 51, which at its rear end is connected to a threaded member 51ª which engages with a threaded socket 52 pivotally connected with an upwardly extending link 53. This link is mounted upon one end of a Z-shaped rod 54, one end of this rod being journaled in a casting 55 carried by the rear of the plow beam, and the other end being journaled in the sleeve 56 mounted upon the upwardly extending portion 57 of the bent axle 58 for the rear furrow wheels or caster wheels 59. Pivotally mounted upon this sleeve 56, there is a spring-operated dog 60 which is adapted to engage with a notch in a collar 61 rigidly mounted on the end of the vertically extending portion 57 of the rear axle. Connected to this dog 60, there is a link 62, the opposite end of which link is connected to a second link 63 pivotally connected with an I-bolt 64 mounted on the transverse channel bar 17. Pivotally connected to the upper portion of this sleeve 56, and extending forwardly, is a link 65, the forward end of this link being pivotally connected to the plow beam 15.

Pivotally mounted upon the cross shaft 26, there is a hand-lever 68 which is provided with the usual spring tooth for engaging with the teeth on an arc rack 69 rigidly mounted upon the plow beam 15. This hand lever is provided with a downwardly and rearwardly extending arm 70 provided with a slotted end portion through which the end of the rod 71 passes. Mounted upon the end of this rod 71, are a pair of lock nuts 72, which are adapted to engage with the arm 70, these lock nuts being provided so that the effective length of the rod 70 may be varied. The opposite end of this rod 71 is connected to the lateral end portion 24 of the axle. Secured to this portion 70 of the hand-lever 68, there is a spring 70ª, the opposite end of which is secured to the transverse channel bar 17, which spring operates to assist in the operation of the hand-lever in raising the lister.

Mounted upon the transverse channel bars 17 are the usual seed cans 73, from which extend the seed spout 74, the usual furrow opener 75, sub-soiler 76, disk coverer 77, and coulter 78, all being provided in the well-known manner and forming no part of my present invention. In order to automatically drive the seed shaft 79, I provide at one end thereof, a driving chain 80 passing around the sprocket 81, mounted upon the end of the seed shaft, and over the idler sprockets 82 and around a driving sprocket 83, mounted on a sleeve 84, loosely mounted upon the transversely extending end portion 24 of the axle 22. The end of this sleeve 84 is provided with a set of teeth adapted to engage with a complementary set of teeth carried by a sleeve on which the clutch wheel 27 is mounted. A spring 85 operates to force the sleeve 84 in a direction so that its clutch teeth will engage the complementary clutch teeth on the axle. These two clutch members are held apart, however, by means of an arm 86 journaled on the cross shaft 26. This arm 86 is provided with a U-shaped yoke, the arms 87 of which are tapered and inserted between the sleeve 84 and the sleeve of the clutch wheel 27, thus holding the clutch teeth out of engagement. When the lister is lowered, however, the arms 87 of the yoke are withdrawn from engagement with the sleeves, and thus the spring 85 presses the clutch teeth into engagement, and thereby operates the seed shaft. This movement of the yoke is occasioned by reason of the fact that during the raising and lowering movement of the lister, the bent axle 24 and the arm 86 swing about different centers. The idler sprockets 82 are carried by arms 88, 89, mounted on a collar 90, loosely mounted on the cross shaft 26. A spring 91 is connected to one of these arms, this spring being connected at its opposite end to the channel bar 17. This spring operates to swing the arms in a clockwise direction, as viewed from the right of the machine, as shown in Fig. 1, to thereby maintain the proper tension on the driving chain 80 during the raising and lowering movement of the lister.

The operation of the machine is as follows:—

Assuming that the plow-bodies and seeding mechanism are lowered into the ground,—that is, in seeding or planting position—and it is desired to raise the same out of the ground into the position shown in full lines in Fig. 1; the operator pulls upon the cord or rope 42, thereby rocking the operating lever 41 so that this strikes the cross rod 39, thereby rocking the same about its pivotal mountings and causing the end portions 40 to be rocked rearwardly. When the plows are in the ground, the parts are in the relative position shown in dotted lines in Fig. 4,—that is, the arms 30 are held in their uppermost position so that the dog 31 is out of engagement with the clutch, this position being maintained by reason of the links 32, 33, being held over centers by the spring 34. At this time the end 40 of the transverse rod 39 is at the outermost end of the slot in the end of the bar 37. When, however, the end 40 of the transverse rod is rocked rearwardly, this breaks the center of these two links and pulls the same into the position shown in dotted lines in Fig. 5, the spring 34 then operating to force the dog 31 into engagement with the clutch wheel. By reason of the slotted connection between the ends of the transverse rod 39 and the bars 37 on opposite sides of the implement, it is possible for these bars 37 to have independent movement to thereby permit the dog 31 on one side of the machine to be thrown into engagement with its corresponding clutch wheel, independently of the time when the dog on the other side of the machine is thrown into engagement with its clutch wheel. The axle 22 is divided at the center—that is, constructed in two sections as indicated in dotted lines in Fig. 2—in order to permit this independent operation of the clutch mechanism. This arrangement is necessary by reason of the fact that the two clutch wheels are not necessarily in exact synchronism, and, therefore, one clutch wheel may be in a position to engage its dog at the instant that the other dog is riding upon the upper surface of its clutch wheel. This clutch wheel being constantly driven, the engagement of the roller with the clutch wheel causes the arm 30 to be swung about the transverse shaft 26, and in this manner causes the crank axle to be rocked in a direction to swing the wheels downwardly and rearwardly, as shown in the position indicated in full lines in Fig. 5. As the arm 30 swings downwardly, as shown in Fig. 5, about the shaft 26 as a center, and the crank axle swings about a shorter axis, the lugs 29 projecting from the side of the clutch wheel strike the arms 30 and thus force the dog 31 out of engagement with this clutch wheel, and throwing the links 32, 33, into a position so that the spring 34 pulls these links over centers into the position shown in full lines in Fig. 5. When the links are thus thrown over centers, the bar 37 pulls upon the end 40 of the transverse rod 39, and thus returns this transverse rod to its normal position. This disengagement occurs at the instant that the plow bodies and seeding mechanism have been raised to a predetermined height above the ground. During this movement, the friction rod 48 passes freely through the opening 47 in the friction link 44, this rod moving to the right, as shown in Figs. 4 and 6. When the dog 31 is disengaged from the clutch, however, the plows are held in raised position by means of this friction rod engaging the sides of the opening in the friction arm, as this friction lock effectively prevents any such return movement of the rod 48 at this time. The pressure exerted by the rod 48 would merely tend to rock the link 44 farther to the left, so as to increase the frictional bite on this friction rod, and thus the stronger pressure exerted by the rod 48, due to the weight of the plows, the greater the resistance offered by the frictional link 44. Thus this friction-grip operates to securely hold the plows in their raised position.

During this raising movement of the lister, the bell crank 49 on the axle has likewise been rocked, thus pushing rearwardly on the rod 51 to thereby rock the arm 53, thus rocking the Z-member 54 to press downwardly upon the axle of the rear caster wheels, thus raising the rear end of the plow. During this movement, the link 65 operates to maintain the plow beams substantially parallel with the ground. It will be seen that when the plows are lowered,—that is, the parts shown in dotted line position in Fig. 6,—the spring dog 60 is in engagement with the notch in the rack carried by the upper end of the rear axle shaft, and thus the rear caster wheels are held in a straight-ahead position. When, however, the plows are raised, the distance from the I-bolt 64, at the end of the links 62, 63, to the spring dog is greater, and thus these links pull this spring dog out of engagement with the notch on the ratchet, and thus, when the plows are raised, the rear wheels are free to caster. Likewise, during this raising operation, the arm 86 is forced between the sleeve 84 and the sleeve of the clutch wheel 27, thus separating the teeth of the clutch and disengaging the seeding mechanism. After the operating lever 41 has been swung forwardly, as above described, to cause the lister to be raised, it is returned to its normal position by means of the springs 46 acting through the rods 43.

When it is desired to lower the plows into the ground, the operator again pulls on the rope 42, and thus causes the arm 41 to swing forwardly, thus pulling on the rods 43 and swinging the friction link 44 to the right against the tension of the spring 46. This movement of the friction link 44 immediately frees the rod 48, so that it can slide through the opening 47, and thus the weight of the plows operates to cause the same to be lowered into the ground. The extent of this movement is regulated by means of the lock nut 72 at the end of the rod 71 engaging with the end 70 of the hand-lever. Thus by properly positioning the hand-lever in the different segments of the quadrants 69, the extent to which the plows are lowered can be readily regulated.

In order to provide for a suitable lateral adjustment of the various parts of the mechanism, to accommodate the same for different distances between rows, it will be noticed that the various parts mounted upon the axle 22 and cross shafts 26 and 79 are all adjustably mounted upon these cross members by suitable pin-and-hole connections.

It will thus be seen that I have devised a very efficient machine in which the lister can be quickly raised out of the ground and locked in its raised position and then lowered by gravity. By my construction, the lister is always raised to the same predetermined height above the ground, irrespective of the depth to which it has been lowered for the seeding operation. With my invention, the hand-lever can be set to correspond to the depth to which the lister is to be lowered, and when the lister is raised by the power-operated means this hand-lever does not move but remains stationary and when the lister is again lowered into the ground, the hand-lever determines the extent of this movement and enables the operator to be able to always lower the implement to the same predetermined extent. Furthermore, by the use of my improved locking or holding means, the lister is efficiently held in raised position, this locking means operating at any time the operating dog is released from its clutch.

While I have illustrated my invention particularly with a two-row lister, it will be understood that I do not wish to be limited to such construction, as certain features of my invention are of broader scope and are adapted for use with other forms of implement, such as devices employing only cultivating devices or tractor plows. And, likewise, while I have preferred to operate the devices by power derived from both the ground wheels, it will be understood that I do not wish to be limited to such construction, as in certain instances power may be derived from a single ground wheel, although I find that a more even operation is obtained by obtaining the power from both ground wheels.

What I claim as my invention is:

1. In a power lift implement, a plurality of plow beams, a transverse axle secured to said beams and having offset laterally extending end portions, supporting wheels mounted upon said end portions, clutch mechanism associated with each of said wheels, a single controlling means for controlling the operation of both of said clutch mechanisms, whereby the power derived from said supporting wheels operates to rock said axle to thereby raise said plow beams, and means for automatically disconnecting the power from the axle when said beams have been raised to a predetermined height above the ground.

2. In a power lift implement, a plurality of plow beams, a transverse axle secured to said beams and having offset laterally extending end portions, supporting wheels mounted upon said end portions, clutch mechanism associated with each of said wheels, an operating lever mounted centrally of the machine for controlling the operation of both of said clutch mechanisms, whereby the power derived from said supporting wheels operates to rock said axle to thereby raise said plow beams, and means for automatically disconnecting the power from the axle when said beams have been raised to a predetermined height above the ground.

3. In a power-lift implement, a pair of plow beams mounted upon opposite sides of the implement, plow bodies supported thereby, a transverse axle to which said plow beams are secured, said axle having offset lateral extensions at its opposite ends, supporting wheels mounted upon said axle extensions, a clutch wheel mounted upon each of said axle extensions and constantly driven thereby, a dog associated with each of said clutch wheels, a single controlling means for throwing said dogs into engagement with said clutch wheels, means controlled by said clutch mechanisms for rocking said axle to thereby raise said plow beams, and means for disengaging said dogs from said clutch mechanisms when said plow beams have been raised to a predetermined height above the ground.

4. In a power-lift implement, a pair of plow beams mounted upon opposite sides of the implement, plow bodies supported thereby, a transverse axle to which said plow beams are secured, said axle having offset lateral extensions at its opposite ends, supporting wheels mounted upon said axle extensions, a clutch wheel mounted upon each of said axle extensions and constantly driven thereby, a dog associated with each of said clutch wheels, a single controlling means for rocking said axle to thereby raise said plow beams, means for disengaging said dogs from said clutch mechanisms when said plow beams have been raised to a predetermined height above the ground, and means for holding said plow beams in raised position.

5. In a power-lift implement, a pair of plow beams mounted on opposite sides of said implement, a transverse axle secured to said plow beams and having offset lateral extensions, supporting wheels mounted upon said axle extensions, a clutch wheel associated with each of said supporting wheels and constantly driven thereby, a transverse shaft mounted adjacent said axle, a pair of arms mounted on said shaft adjacent each of said clutch wheels, each of said arms carrying a dog, and single controlling mechanism for rocking said arms to thereby cause said dogs to engage the corresponding clutch wheel to thereby rock said arms and thus rotate said axle to raise the plow beams.

6. In a power-lift implement, a pair of plow beams mounted on opposite sides of said implement, a transverse axle secured to said plow beams and having offset lateral extensions, supporting wheels mounted upon said axle extensions, a clutch wheel associated with each of said supporting wheels and constantly driven thereby, a transverse shaft mounted adjacent said axle, an arm mounted on said shaft adjacent each of said clutch wheels, each of said arms carrying a dog, a single controlling mechanism for rocking said arms to thereby cause said dogs to engage the corresponding clutch wheel to thereby rock said arms and thus rotate said axle to raise the plow beams, and one or more lateral lugs extending from the face of said clutch wheels for engaging said arms to thereby force the dog out of engagement with said clutch wheels when the plow beams have been raised to a predetermined point.

7. In a power-lift implement, a plurality of plow beams, a transverse axle secured to said beams and having an offset lateral extension, a supporting wheel mounted thereon, a clutch wheel mounted upon said axle extension and constantly driven by said supporting wheel, a transverse shaft adjacent said axle, an arm mounted upon said shaft and carrying a dog for engagement with said clutch wheel, a pair of pivoted links connecting said arm to a portion of said axle, a spring normally exerting a tension on one side of the center line of said links to maintain them in position to hold said dog out of engagement with said clutch wheel, an arm connnected to a midpoint of said links, and means for operating said arm to thereby rock said links to permit said dog to engage said clutch wheel, said spring then operating to hold said dog in engagement with said clutch wheel.

8. In a power-lift implement, a plurality of plow beams, a transverse axle secured to said beams and having an offset lateral extension, a supporting wheel mounted thereon, a clutch wheel mounted upon said axle extension and constantly driven by said supporting wheel, a transverse shaft adjacent said axle, an arm mounted upon said shaft and carrying a dog for engagement with said clutch wheel, a pair of pivoted links connecting said arm to a portion of said axle, a spring normally exerting a tension on one side of the center line of said links to maintain them in position to hold said dog out of engagement with said clutch wheel, an arm connected to a midpoint of said links, means for operating said arm to thereby rock said links to permit said dog to engage said clutch wheel, said spring then operating to hold said dog in engagement with said clutch wheel, and a lug projecting laterally from said clutch wheel for engaging said arm to thereby force said dog out of engagement with said clutch wheel at a predetermined point.

9. In a power-lift implement, a plurality of plow beams, a transverse axle secured to said beams, and having an offset lateral extension, a supporting wheel mounted thereon, means for rocking said axle to thereby raise said plow beams, an arm secured to said axle, a friction rod connected to said arm, a pivotally mounted friction plate having an opening through which said rod passes, a spring connected to said plate and exerting a tension thereon, whereby said rod is permitted to slide freely through said opening in one direction to permit the raising of the plows but is held against movement in the opposite direction to thereby hold said plows in raised position.

10. In a power-lift implement, a plurality of plow beams, a transverse axle secured to said beams and having an offset lateral extension, a supporting wheel mounted thereon, means for rocking said axle to thereby raise said plow beams, an arm secured to said axle, a friction rod connected to said arm, a pivotally mounted friction plate having an opening through which said rod passes, a spring connected to said plate and exerting a tension thereon, whereby said rod is permitted to slide freely through said opening in one direction to permit the raising of the plows, but is held against movement in the opposite direction to thereby hold said plows in raised position, and means for rocking said plate against the tension of said spring to thereby permit said rod to pass freely through said opening and thus permit the plow beams to be lowered.

11. In a power-lift implement, a pair of plow beams mounted upon opposite sides of said implement, an axle extending transversely of the implement and secured to said plow beams, said axle having offset lateral extensions supporting wheels mounted upon said extensions, clutch mechanism associated with each of said wheels and having a driving element constantly driven thereby, a transverse shaft mounted adjacent said axle, an arm at each end of said shaft, each of said arms carrying a driven element, a single controlling means for moving said arms to cause said driven elements to engage said driving elements of said clutch mechanisms, to thereby rotate said arms and thus rock said axle to thereby raise said plow beams, and slotted connections between said controlling means and said arms thereby permitting limited movement of one arm with respect to the other.

12. In a power-lift implement, a pair of plow beams mounted on opposite sides of said implement, a transverse axle secured to said plow beams and having offset lateral extensions, supporting wheels mounted upon said axle extensions, a clutch wheel associated with each of said supporting wheels and constantly driven thereby, a transverse shaft mounted adjacent said axle, a pair of arms mounted on said shaft and adjacent each of said clutch wheels, each of said arms carrying a dog, single controlling mechanism for rocking said arms to thereby cause said dogs to engage the corresponding clutch wheel to thereby rock said arms and thus rotate said axle to raise the plow beams, and slotted connections between said controlling means and said arms thereby permitting limited movement of one arm with respect to the other.

13. In a power-lift implement, a pair of plow beams mounted on opposite sides of said implement, a transverse axle secured to said plow beams and having offset lateral extensions, supporting wheels mounted upon said axle extensions, a clutch wheel associated with each of said supporting wheels and constantly driven thereby, a transverse shaft mounted adjacent said axle, an arm mounted on said shaft adjacent each of said clutch wheels, each of said arms carrying a dog, a single controlling mechanism for rocking said arms to thereby cause said dogs to engage the corresponding clutch wheel to thereby rock said arms and thus rotate said axle to raise the plow beams, one or more lateral lugs extending from the face of said clutch wheels for engaging said arms to thereby force the dog out of engagement with said clutch wheels when the plow beams have been raised to a predetermined point, and slotted connections between said controlling means and said arms thereby permitting limited movement of one arm with respect to the other.

14. In a power-lift implement, a pair of plow beams mounted upon opposite sides of the implement, plow bodies supported thereby, a transverse axle to which said plow beams are secured, said axle having offset lateral extensions at its opposite ends, supporting wheels mounted upon said axle extensions, a clutch wheel mounted upon each of said axle extensions and constantly driven thereby, a dog associated with each of said clutch wheels, an operating lever, independent connections therefrom to each of said dogs for throwing same into engagement with said clutch wheels, said connections permitting a limited independent movement of one dog with respect to the other, and means controlled by the engagement of said dogs with the clutch wheels for rocking said axle angularly relative to said beams to thereby raise said plow beams.

15. In a power-lift implement, a pair of plow beams mounted upon opposite sides of the implement, plow bodies supported thereby, a transverse axle to which said plow beams are secured, said axle having offset lateral extensions at its opposite ends, supporting wheels mounted upon said axle extensions, a clutch wheel mounted upon each of said axle extensions and constantly driven thereby, a dog associated with each of said clutch wheels, a single controlling means for rocking said axle to thereby raise said plow beams, means for disengaging said dogs from said clutch mechanisms when said plow beams have been raised to a predetermined height above the ground, an operating lever, independent connections therefrom to each of said dogs for throwing same into engagement with said clutch wheels, said connections permitting a limited independent movement of one dog with respect to the other, means controlled by the engagement of said dogs with the clutch wheels for rocking said axle to thereby raise said plow beams, and friction means for holding said plow beams in raised position.

16. In a power-lift implement, a plurality of plow beams, a transverse axle secured to said beams and having an offset lateral extension, a supporting wheel thereon, a rear supporting wheel, an axle therefor, connections between said transverse axle and said rear axle, means for rocking said transverse axle to thereby simultaneously raise the front and rear ends of said plow beams, an arm secured to said axle, a friction rod connected to said arm, a pivotally mounted friction plate having an opening through which said rod passes, a spring connected to said plate and exerting a tension thereon, whereby said rod is permitted to slide freely through said opening in one direction to permit the raising of the plows, but is held against movement in the opposite direction to thereby hold said plows in raised position, and means for rocking said plate against the tension of said spring to thereby permit said rock to pass freely through said opening and thus permit the plow beams to be lowered.

17. In a power-lift implement, a plurality of plow beams, a transverse axle secured to said beams and having offset lateral extensions, supporting wheels mounted upon said axle extensions, a clutch wheel associated with each of said supporting wheels and constantly driven thereby, a transverse shaft adjacent said axle, an arm mounted on said shaft adjacent each of said clutch wheels, each of said arms carrying a dog for engagement with the corresponding clutch wheel, a pair of pivoted links connecting each of said arms to a portion of said axle, a spring associated with each pair of links normally exerting a tension on one side of the center line of said links to maintain them in position to hold said dogs out of engagement with the corresponding clutch wheels, an arm connected to the midpoint of each pair of links, and a single controlling means for operating said arms to thereby rock both pairs of links to permit the dogs to engage with said clutch wheels, said spring then operating to hold said dogs in engagement with said clutch wheels.

18. In a power-lift implement, a plurality of plow beams, a transverse axle secured to said beams and having offset lateral extensions, supporting wheels mounted upon said axle extensions, a clutch wheel associated with each of said supporting wheels and constantly driven thereby, a transverse shaft adjacent said axle, an arm mounted on said shaft adjacent each of said clutch wheels, each of said arms carrying a dog for engagement with the corresponding clutch wheel, a pair of pivoted links connecting each of said arms to a portion of said axle, a spring associated with each pair of links normally exerting a tension on one side of the center line of said links to maintain them in position to hold said dogs out of engagement with the corresponding clutch wheels, an arm connected to the midpoint of each pair of links, a single controlling means for operating said arms to thereby rock both pairs of links to permit the dogs to engage with said clutch wheels, said spring then operating to hold said dogs in engagement with said clutch wheels, and lugs projecting laterally from said clutch wheels for engaging said arms to thereby force said dogs out of engagement with the clutch wheels at a predetermined point.

19. In a power-lift implement, a plurality of plow beams, a transverse axle secured to said beams and having offset lateral extensions, supporting wheels mounted upon said axle extensions, a clutch wheel associated with each of said supporting wheels and constantly driven thereby, a transverse shaft adjacent said axle, an arm mounted on said shaft adjacent each of said clutch wheels, each of said arms carrying a dog for engagement with the corresponding clutch wheel, a pair of pivoted links connecting each of said arms to a portion of said axle, a spring associated with each pair of links normally exerting a tension on one side of the center line of said links to maintain them in position to hold said dogs out of engagement with the corresponding clutch wheels, an arm connected to the midpoint of each pair of links, an operating lever, and independent connections therefrom to each of said arms for operating the same to thereby rock both pairs of links to permit the dogs to engage with said clutch wheels, said connections permitting a limited independent movement of one arm with respect to the other.

20. In a power-lift implement, a pair of plow beams mounted upon opposite sides of the implement, plow bodies supported thereby, a transverse axle to which said plow beams are secured, said axle having offset lateral extensions at its opposite ends, supporting wheels mounted upon said axle extensions, a clutch wheel mounted upon each of said axle extensions, and constantly driven thereby, a dog associated with each of said clutch wheels, a single controlling means for rocking said axle to thereby raise said plow beams, means for disengaging said dogs from said clutch mechanisms when said plow beams have been raised to a predetermined height above the ground, friction means for holding said plow beams in raised position, means to thereby permit said beams to be lowered by gravity, and adjustable hand-lever controlled means for determining the extent to which said beams are lowered.

Signed by me at Rock Island, Illinois, this 24th day of June, 1919.

LEE H. KAUPKE.